United States Patent [19]
Brunelli et al.

[11] Patent Number: 5,764,790
[45] Date of Patent: Jun. 9, 1998

[54] METHOD OF STORING AND RETRIEVING IMAGES OF PEOPLE, FOR EXAMPLE, IN PHOTOGRAPHIC ARCHIVES AND FOR THE CONSTRUCTION OF IDENTIKIT IMAGES

[75] Inventors: Roberto Brunelli, Trento; Ornella Mich, Povo, both of Italy

[73] Assignee: Istituto Trentino Di Cultura, Trento, Italy

[21] Appl. No.: 520,479

[22] Filed: Aug. 29, 1995

[30] Foreign Application Priority Data

Sep. 30, 1994 [IT] Italy .................................. TO94A0765

[51] Int. Cl.$^6$ ...................................................... G03K 9/00
[52] U.S. Cl. ................................................ 382/118; 382/115
[58] Field of Search ............................... 382/115, 117, 382/118, 190, 254, 306; 395/141, 143

[56] References Cited

U.S. PATENT DOCUMENTS

| | | | |
|---|---|---|---|
| 5,161,204 | 11/1992 | Hutcheson et al. | 382/190 |
| 5,164,992 | 11/1992 | Turk et al. | 382/118 |
| 5,274,714 | 12/1993 | Hutcheson et al. | 382/190 |

OTHER PUBLICATIONS

IEEE Transactions on Pattern Analysis and Machine Intelligence, vol. 15, No. 10, 1 Oct. 1993, pp. 1042–1052, R. Brunelli et al. "Face Recognition: Features Verses Templates".

IEEE Tencon' 93 Computer, Communication, Control and Power Engineering, vol. 2/5, 19 Oct. 1993, Beijing, China, pp. 1126–1129, X. Dunhe et al. "The recognition of human faces by computer".

Proceedings of the Computer Society Conf. on Computer Vision a Pattern Recognition, Seattle, Jun. 21–23, 1994, A. Pentland et al. "View–Based and Modular Eigenspaces for Face Recognition".

IEEE Trans. on Pattern Analysis and Machine Intelligence, vol. 12, No. 1, 1 Jan. 1990, pp. 103–108, M. Kirby et al. "Application of the Karhunen–Loeve procedure for the characterization of human faces".

IEEE Trans. on Pattern Analysis and Machine Intelligence, vol. 17, No. 10, Oct. 1995, pp. 955–966, R. Brunelli et al. "Person Identification Using Multiple Cues", sec. III. Face recognition.

"Handbook of facial growth", Phila, W.B. Saunders, second Edition, 1982., Chapter 1, pp. 1–23.

"The Image Processing Handbook", John C. Russ, CRC Press, 224 pgs. undated.

"A Heuristic Strategy for Developing Human Facial Images on a CRT", M.L. Gillenson et al., Pergamon Press, 1975, vol. 7, pp. 187–196, Great Britain.

(List continued on next page.)

*Primary Examiner*—Leo Boudreau
*Assistant Examiner*—Christopher Kelley
*Attorney, Agent, or Firm*—Sughrue, Mion, Zinn, Macpeak & Seas, PLLC

[57] ABSTRACT

In a method of storing and retrieving images of people, for example, in photographic archives and for the construction of identikit images, each characteristic (or feature) of the images to be stored is associated with a region the size of which corresponds to the average size of the feature in the images stored. If $\{F_i\}_{i=1, \ldots, N}$ is a set of images of the feature, where $F_i$ is the image associated with each of the N people in the data base, on the basis of these images, a new set of images $\{\Phi_j\}_{j=0, 1, \ldots, N}$ of the type $$F_i = \sum_{j=1}^{N} C_{Fij}\Phi_j + \Phi_o$$

is generated, of which a subset $\{\Phi\}_{i=0, \ldots, K}$ can be used to approximate, encode, compare and construct images of the type in question in an interactive manner. The method is particularly applicable to techniques for searching photographic archives and for the construction of identikit images.

42 Claims, 2 Drawing Sheets

OTHER PUBLICATIONS

"Investigating Face Recognition With an Image Processing Computer", Nigel D. Haig, Perception, Chap. 10, pp. 410–425 1985.

"Face Recognition and Recall Using Computer–Interactive Methods with Eye Witnesses", John Shepherd et al., pp. 129–148, Ablex Publishing Corp., New Jersey, 1992.

"The Recall and Reconstruction of Faces: Implications for Theory and Practice", Graham Davies, Chap. 10, pp. 388–397, Martinus Nijhoff Publishers, 1986.

Shape Transformation Models and Their Applications in Pattern Recognition, Z.C. Li et al., Int'l. Journal of Pattern Recognition and Artifical Intellignece, vol. 4, No. 1 (1990) pp. 65–94.

"Faces as Patterns", V. Bruce, Lawrence Erlbaum Assoc., 1988, pp. 37–58.

"Algorithms for Clustering Data", Anil Jain et al., Prentice Hall, New Jersey, pp. 55–142 undated.

"Exploring recognition with interchanged facial features", Nigel D. Haig,1986 Perception, vol. 15, pp. 235–247, Great Britain.

"The effect of feature displacement on face recognition", Nigel D. Haig, Perception, 1984, vol. 13 pp. 505–512.

"A witness–computer interactive system for searching mug files", David R. Lenorovitz et al., Cambridge University Press, 1984, pp. 38–63.

"Identification of familiar and unfamiliar faces from internal and external features: some implica–for theories of face recognition", Ellis, et al., Perception, 1979, vol. 8, pp. 431–439.

METHOD OF STORING AND RETRIEVING IMAGES OF PEOPLE, FOR EXAMPLE, IN PHOTOGRAPHIC ARCHIVES AND FOR THE CONSTRUCTION OF IDENTIKIT IMAGES

FIELD OF THE INVENTION

In general, the present invention addresses the problem of storing and retrieving images of people, for example, in order to produce photographic archives, particularly in connection with the performance of the so-called identikit function.

DESCRIPTION OF THE PRIOR ART

At the moment, two main methods are followed for establishing people's identities when the memory of an eye witness is to be used: the first method consists of showing the witness a series of photographs; the second method consists of making an identikit image, that is, a reconstruction of the physiognomic features of the individual sought.

The method of searching for a known face in a set of photographs has one great disadvantage; these sets are often very large, sometimes comprising some tens of thousands of subjects and, in order to achieve a good result of the search, this involves a considerable concentration span on the part of the witness. It fact, it has been found that the number of false recognitions increases as the size of the set increases.

The problems relating to the second method mentioned, that is, the construction of an identikit image, are connected with the fact that, whether or not the witness is a draughtsman, he has to interact with the operator actually forming the identikit image, giving him as precisely as possible a verbal description of the face to be reconstructed. The witness must therefore have a good linguistic ability and be able to interact positively with the operator.

To describe a face means to state how the various parts which make it up are formed (shape, colour, size, etc.) and how they are distributed. It should be pointed out that, in the following description, the term "parts" is used interchangeably with the term "features" or with the term "characteristics" to make the description more precise. The various features of the human face can be separated into internal features (eyes, nose, mouth) and external features (ears, chin, hair, overall shape of the face, etc.).

A fundamental result of research into the process of recognizing faces which has to be taken into account for the construction of identikit systems is that documented, for example, in the article "Identification of familiar and unfamiliar faces from internal and external features: some implications for theories of face recognition", by H. D. Ellis, J. W. Shepherd and G. M. Davies, Perception, 8:431–439, 1979. In particular, it has been found that the external and internal features are equally important for recognizing unfamiliar faces, whereas for recognizing familiar faces, the internal features are more important. This fact is also recognized in G. Davies' article "The recall and reconstruction of faces: Implications for theory and practice" reproduced at Chapter 10, pages 388–397 of the text "Aspects of Face Processing" edited by H. D. Ellis, M. A. Jeeves, F. Newcombe and A. Young, Editors, Martinus Nijhoff Publishers, 1986.

Up to now, various systems, sometimes using electronic processors, have been used to construct identikit images and to run through vast photographic data bases in an intelligent manner. Some examples of these systems for searching for faces basing on extensive data are CAPSAR (for a complete description see, for example, the article "A witness-computer interactive system for searching mug files" by D. R. Lenorovitz and K. R. Laughery, reproduced in the text "Eyewitness Testimony. Psychological Perspectives", edited by G. R. Wells and E. F. Loftus, Cambridge, England: Cambridge University Press, 1984) and FRAMES (in this connection see the article by J. Shepherd and H. Ellis "Face recognition and recall using computer-interactive methods with eye witnesses" reproduced at Chapter 6, pages 129–148 of the text "Processing Images of Faces" edited by Vicki Bruce and Mike Bruton, Ablex Publishing Corporation—Norwood, New Jersey, 1992.

Systems such as WHATSISFACE can construct identikit images; this is a man-machine system with which a subject who is not an artist constructs, on a graphic display, any face shown by a photograph placed in front of him (for a description see the article by M. L. Gillenson and B. Chandrasekaran "A heuristic strategy for developing human facial images on a CRT" Pattern Recognition, 7:18714 196, 1975) and Identi-Kit which supplies a set of possibilities for some features of the face (eyes, nose, mouth, hair and outline) in the form of drawings on transparent sheets; the face is constructed by superimposing these drawings (in this connection see V. Bruce's work "Recognizing Faces," Chapter: Faces as Patterns, pages 37–58, Lawrence Erlbaum Associates, 1988, and the article "Sketch artist and identi-kit procedure for recalling faces " by K. R. Laughery and R. H. Fowler in the "Journal of Applied Psychology", 65(3) :307–316, 1980). The so-called Photofit system, which is the photographic version of the previous system, may also be mentioned. Computerized versions of the last-mentioned systems are Mac-a-Mug Pro and E-FIT (see the article by J. Shepherd and H. Ellis "Face recognition and recall using computer-interactive methods with eye witnesses", already mentioned above).

The main assumption of Identi-Kit and Photofit systems relates to the way in which a face is perceived; in fact they consider it a set of independent features which can be added or subtracted, always independently of one another (the face is seen simply as the combination of its parts). This assumption conflicts with those studies which hold that, in the recognition process, the face is considered as a whole, in which the relationships between the various features are fundamental.

This could be one of the reasons why these systems are not very efficient.

In fact, various works have shown the superiority of the cognitive process which considers the face as a whole, that is, the importance of the relative functions of the various characteristics or features. Some works by Haig, such as the articles "The effect of feature displacement on face recognition", Perception 13:505–512, 1984, "Exploring recognition with interchanged facial features" Perception, 15:235–247, 1986 and also "Investigating face recognition with an image processing computer", reproduced at Chapter 10, pages 410–425 of the text "Aspects of face processing" edited by H. D. Ellis, M. A. Jeeves, F. Newcombe, and A. Young, Dordrecht: Martinus Nijhoff, 1986, have confirmed that human observers are sensitive to small adjustments in the positions of the features within the face. In the systems mentioned, however, it is not possible to change the distance between certain features, for example, the distance between the eyes is fixed. Another problem could be due to the fact that features are put together which in reality could not go together (in this connection, see D. H. Enlow "Handbook of Facial Growth" Philadelphia: W. B. Saunders, second Ed. 1982). Research into the effectiveness of the two systems, that is, the Photofit and Identi-Kit systems, indicate that their performance is also poor because of the limited number of alternatives provided for each feature and for the shapes of the face. Moreover, they are considered difficult to use because it is necessary to seek the desired shape of the feature from sets of alternatives which are isolated from the overall configuration of the face.

OBJECTS AND SUMMARY OF THE INVENTION

The object of the present invention is therefore to provide a solution which overcomes the intrinsic disadvantages of previously known solutions.

According to the present invention, this object is achieved by virtue of a method having the specific characteristics recited in the following claims. The invention also relates to a system for implementing the method.

The solution according to the present invention can be used either for effective searching within a vast photographic archive or for the creation of identikit images directly by the witness. In particular, the invention overcomes the limitations of the two principal methods mentioned in the introduction to the present description, in the first case, by limiting the number of photographs which the witness has to analyze and, in the second case, by allowing the witness to create the identikit image directly with an immediate visual check and with the ability to make use of a practically unlimited number of alternatives.

BRIEF DESCRIPTION OF THE DRAWINGS

The invention will now be described, purely by way of non-limiting example, with reference to the appended drawings, in which.

DETAILED DESCRIPTION OF THE PREFERRED EMBODIMENTS

As a basic datum, it should be pointed out that a system according to the invention, in its currently-preferred embodiment, is suitable to be formed with the use of a processing device such as a personal computer or the like, suitably programmed (according to known criteria within the normal capabilities of an expert in the art) so as to achieve the function described specifically below. Alternatively and in certain applications such as, for example, applications which require a certain processing speed (as may be the case if the system is used, for example, for controlling access of personnel to a closed area) it is also possible to envisage the use of separate functional modules each performing the specific function for which it is intended.

Figure 1:
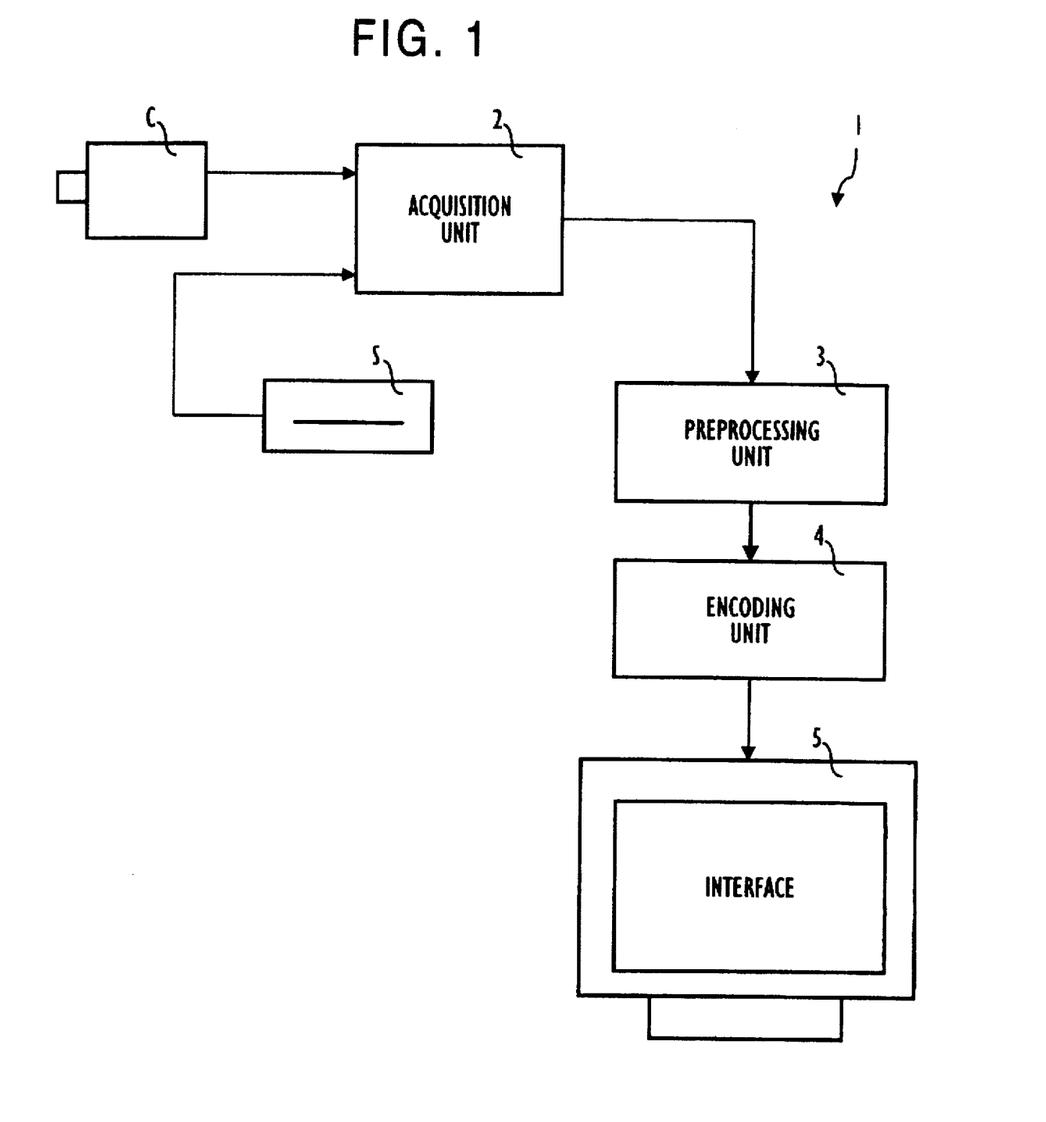
FIG. 1 shows the configuration of a system according to the invention in the form of a functional block diagram.

Essentially, the system according to the invention, generally indicated 1, is composed of four basic modules or units:

an acquisition unit 2 for acquiring images in digital form, a pre-processing unit 3 for pre-processing the images, particularly as regards the standardization of their geometry and intensity values, an encoding unit 4 for encoding the images and updating the data base, and an interface 5 essentially having the function of a user/database graphic interface for enabling the user to use the system easily.

Briefly, it can be stated that the first three units (2, 3, 4) serve essentially for defining all of the data necessary for the operation of the graphic interface 5 which, from the user's point of view, constitutes the system proper.

As far as the operation of the acquisition unit 2 is concerned, the digital input of the system is supplied by means of video cameras C and/or so-called scanners S provided with supply devices, analog/digital converters, etc. Typically, this involves the conversion of photographic archives, such as those with which police forces are equipped, into digital form by means of scanners. Each digital image is associated with further data such as sex, race, age, and identity. All of this is achieved according to widely known criteria which do not need to be described extensively herein.

The pre-processing of the images performed by the unit 3 relates to two different aspects, that is, geometrical standardization and the standardization of intensity values.

The purpose of the geometrical standardization is to ensure that the images supplied to and by the core of the system constituted by the units 4 and 5 are of predetermined size and orientation. This can be achieved automatically, for example, by locating the eyes and transforming the digital image so that the positions of the pupils correspond to positions standardized in the reference system associated with the digitized images. The system also requires the positions of the nose and of the mouth; this can also be achieved automatically with the use, for example, of the techniques described in the article "Face Recognition: Features versus templates" by R. Brunelli and R. Poggio, IEEE Transactions on Pattern Analysis and Machine Intelligence 15(10):10421052, 1993 or by generalizing the approach for locating the eyes discussed in the same article. In the latter case, the system can quantify the reliability of the location and may require the intervention of a human operator.

The standardization of the intensity values, on the other hand, takes account of the fact that the images may come from various sources and may therefore have a variability which is not connected with the subject taken but is related to the conditions in which it was taken. Clearly, variability of this type has to be removed, as far as possible. A first standardization may be effected simply by causing the average intensity value of a specific region of the image (for example, constituted by a rectangular region under each eye) to assume a standard value. This operation eliminates variability due to some features of the photographic and video-signal acquisition processes. Differences due to the orientation and type of illumination can be reduced by transformations such as those described in the volume "The Image Processing Handbook" by John C. Russ, CRC Press, 1992. Alternatively, according to a currently-preferred embodiment, a possible transformation of the image I to reduce differences due to the orientation and to the type of illumination can be described by the formula $$M = \begin{cases} M' & \text{if } M' \leq 1 \\ 2 - \dfrac{1}{M'} & \text{if } M' > 1 \end{cases}$$

in which $$M' = \frac{I}{I * K_{G(\sigma)}}$$

where the symbol * represents the convolution operation, $K_G(\sigma)$ represents a Gaussian convolution kernel the parameter $\sigma$ (standard deviation) of which is connected with the interocular distance and the arithmetic operations are intended to be applied to corresponding elements of the images indicated. The resulting image M can be interpreted clearly by the user of the system. Naturally, this transformation can be integrated with other pre-processing functions.

The encoding of the images enables a set of Q regions to be extracted automatically from an image with the use of the data associated therewith by the modules examined above. These regions may, for example, be hair, eyes, nose, mouth, chin (in a broad sense, that is, chin means the lower part of the face starting from the nose), and the complete face. It is possible to associate with each feature a region, the size of which corresponds to the average size of that feature in the images available. If this region is indicated $r_F$, within the limits of this average region $r_F$, the procedure commonly known as "Analysis of the principal components" as described, for example, in the article "Application of the Karhunen-Loeve procedure for the characterisation of human faces" by M. Kirby and L. Sirovich, IEEE Transactions on Pattern Analysis and Machine Intelligence, 12(1) :10314 108, 1990 can be applied for each feature.

Now, $\{F_i\}_{i=1,\ldots,N}$ may be a set of images of the feature F, where F is the image associated with each of the N people in the data base. These images have the same size and shape ($r_F$) and are aligned (coincidence of a common reference point within or outside the feature). It is possible to define a new set of images $\{\Phi\}_{i=0,1,\ldots,N}$ such that $$F_i = \sum_{j=1}^{N} C_{Fij}\Phi_j + \Phi_0 \qquad (1)$$

in which $$\Phi_0 = \frac{1}{N} \sum_{i=1}^{N} F_i \qquad (2)$$

$$C_{Fij} = (F_i - \Phi_0) \cdot \Phi_j \qquad (3)$$

$$\Phi_j \cdot \Phi_t = \sigma_{jt} j, \ t = 1, \ldots, N \qquad (4)$$

where $\delta_{jt}$ is the Kronecker delta:

$$\delta_{jt} = \begin{cases} 1 & \text{if } j = t \\ 0 & \text{if } j \neq t \end{cases}$$

with the usual notation (the images are considered as vectors obtained by linking the lines of original images, each represented by a set of numbers indicative of the pixels). The images $\Phi_j$ where $1 \leq j \leq N$ are selected as eigenvectors of the covariance matrix of the set $\{F_{i \rightarrow 0}\}$. An eigenvalue $\lambda_{Fj}$ is associated with each eigenvector. It is thus possible to arrange the set $\{\Phi\}_{i=0,1,\ldots,N}$ in a manner such that $\lambda_{Fj} \geq \lambda_{Ft}$ when j<t. By cutting off the expansion (1) at j=k, where k is a number which is usually small in comparison with N (for example k =15), an error $\Delta$, which decreases as the value assumed by k increases, is introduced. Each image (of a region of the face) can then be associated with a vector $$\vec{C}_{Fi} = \{C_{Fi1} \ldots C_{Fik}\} \qquad (5)$$

the knowledge of which, together with that of the images $\{\Phi_j\}_{j=0,\ldots,k}$ enables the corresponding image to be reconstructed approximately.

Each image in the data base can thus be associated with a set of vectors (one for each of the regions of the face used in the system). The effectiveness of the method (the ability to use vectors of smaller dimensionality for the same error A) increases if the images are subdivided beforehand on the basis of race and sex; an independent data base can be created for each race/sex. During the graphical process of creating identikit images, the various facial features created by the user have to be blended harmoniously to create a complete face. Since the integration or "blending" process tends to fade the outer parts of the regions involved, it is useful for the method described above in equation (1) to be applied to regions (RF) larger than the average region ($r_F$), but for the calculation of the covariance matrix and of the expansion coefficients to be limited to the latter region. The region outside $r_F$ and inside $R_F$ is used to connect the various features.

When a very large number of images $\{F_i\}_{i=1,\ldots,N}$ (for example, N>200) is available, the calculation of the eigenvalues and eigenvectors may become difficult because of numerical instabilities. In this case, a subset of the images available may be considered. This subset can be obtained by so-called "clustering" techniques (in this connection see the techniques described in the volume "Algorithms for Clustering Data" by A. K. Jain and R. C. Dubes, Prentice Hall, 1988) with the use of the following value, for example, as the distance between two images X and Y:

$$d^2(X, Y) = \sum_{k=1}^{T} (X_k - Y_k)^2 \qquad (6)$$

where T represents the number of pixels in the image considered as a vector. The distance may also be calculated in the following alternative way:

$$d^2_p = 1 - p_{xy} \qquad (7)$$

where $P_{xy}$ represents the standardized correlation coefficient:

$$p_{XY} = \frac{\mu_{XY}}{\sqrt{\mu_{XX}\mu_{YY}}} \qquad (8)$$

in which $$\mu_{XY} = \frac{1}{T} \sum_{k=1}^{T} \left( X_k - \frac{1}{T} \sum_{j=1}^{T} X_j \right)\left( Y_k - \frac{1}{T} \sum_{j=1}^{T} Y_j \right) \qquad (9)$$

$$\mu_{yy} = \frac{1}{T} \sum_{k=1}^{T} \left( X_k - \frac{1}{T} \sum_{j=1}^{T} Y_j \right)^2 \qquad (11)$$

µxy represents the second-order centred moment of the variables X and Y. The number of groups (clusters) (for example, 100) can be fixed beforehand. Each cluster is represented by the image for which the sum of the disparities with respect to the other images of the cluster is least. The method described above can then be applied solely to the images which represent the clusters.

The graphic interface 5 (operating at the level of processor, mass storage, monitor and windowing software, etc.) provides the user with various functions which enable him:

to select a suitable data base from those available, to select a facial feature (for example, eyes, nose, mouth, hair, chin, whole face) and modify it by acting directly on a compact code of the image.

to see at any time, within the limits of a set of features selected, the images of the people most similar to the image created, to copy the features (one or more) of any of the images displayed into the image under construction, to search the entire data base in a hierarchical manner (with progressive detail or abstraction) presenting characteristic faces representative of more and more restricted and homogeneous (or larger and larger and more heterogeneous) clusters of the population contained in the data base; the search takes place on the basis of a disparity between faces, the disparity being defined as will be explained below, to save the images created in a format suitable for subsequent printing and possibly reprocessing, to store intermediate stages of the operation, and to be aware at any moment of the function of the subsystem of the graphic interface selected, for example, by means of an electronic pointer (such as a mouse or an optical pen).

The identikit image is constructed as the sum of the features available and of an average face (the arithmetic mean of the faces present in the data base) in (any) remaining regions. The user can select the facial feature on which to operate by means of electronic "menus" as shown schematically at SA in FIG. 2 which shows a possible "display" of the graphic interface.

Figure 2:
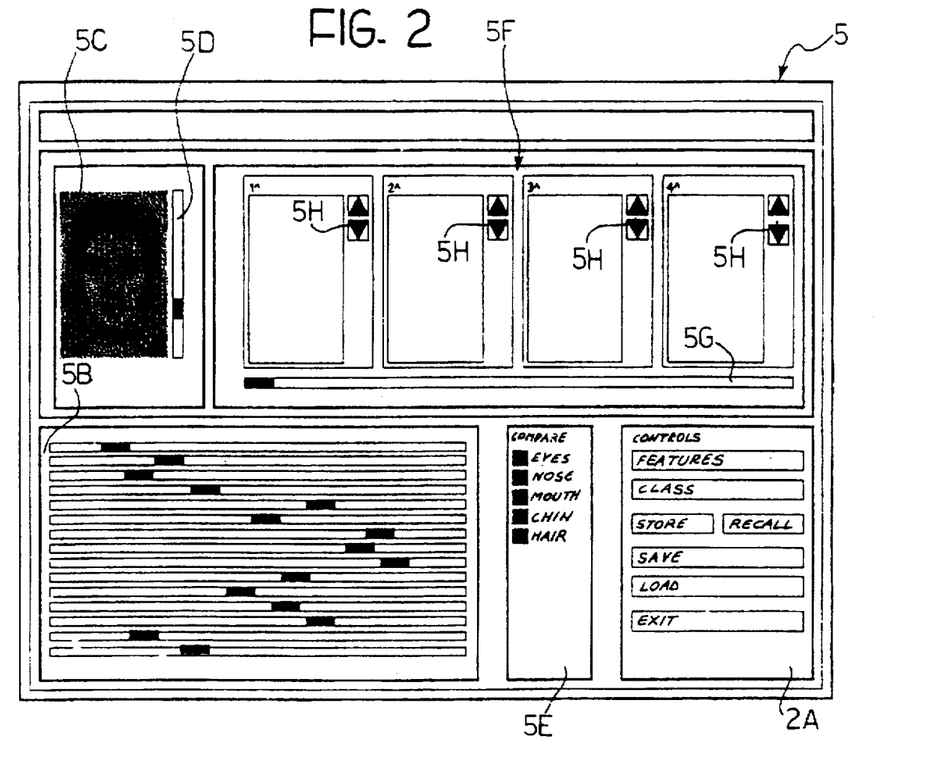
FIG. 2 shows a possible configuration of the graphic interface of a system according to the invention.

By using an electronic pointer (a mouse or a pen), the user can modify the positions of a certain number of cursors 5B each relating to a component of the expansion of formula (1). The cursors 5B are arranged in order of decreasing eigenvalue from top to bottom; the lower cursors bring about smaller changes in the image created than the upper ones. The position of each cursor is associated with a value X of [0, 1]: 0 at the left-hand end and 1 at the right-hand end of its track. This number X is associated with the value of the corresponding co-ordinate $C_{Fj}$ so that the probability distribution D (of the co-ordinate of the data base) verifies the relationship $D(C_{Fj})=X$. This enables a cursor position to be associated with a value for the corresponding co-ordinate, maximizing selectivity. For each region of the face, the system keeps the configuration of the corresponding cursors in its memory and presents them on the screen again when the feature is selected by the user.

The image (indicated 5C in FIG. 2) is reconstructed (the restoration function) for each change in the coordinates (as a result of the movement of the corresponding cursors) using, for each feature, the expansion:

$$F = \sum_{j=1}^{k} C_{Fj}\Phi_j + \Phi_o \quad (12)$$

and then proceeding as specified in the following points.

The features can then be integrated (blended), a priority $P_F$ (for example, $P_{eyes} > P_{mouth} > P_{nose} > P_{hair} > P_{chin} > P_{face}$) being associated with each feature, indicated F. Each feature is then associated with a map of values $W_F$, the size of which corresponds to that of the overall image of the face. Three regions can be identified in this map: a region $R_F$ outside the feature, an inner region $r_F$ (which corresponds to the region used for the calculation of the covariance matrix and of the coefficients) and a transition region ($R_F$–$r_F$). The map values are set at 1 in the inner region, at zero in the outer region, and at an intermediate value in the transition region. This concept is illustrated below, in the case of a one-dimensional region:

$$r_F=[x_1, x_2] \quad (13)$$

$$R_F=[x_0, x_3] \quad (14)$$

where $x_0 < x_1 < x_2 < x_3$.

A possible specification of the values of this map is given (purely by way of example) by:

$$W_f(x) = \begin{cases} 0 & x < x_0 \\ 0 & x > x_3 \\ 1 & x \in [x_1, x_2] \\ \frac{1}{2}\left[1 - \cos\left(\pi \frac{x - x_0}{x_1 - x_0}\right)\right] & x \in [x_0, x_1] \\ \frac{1}{2}\left[1 - \cos\left(\pi \frac{x - x_3}{x_2 - x_3}\right)\right] & x \in [x_2, x_3] \end{cases} \quad (15)$$

The two-dimensional case can be processed with the use of the product of two functions constructed as above, one for the x co-ordinate and one for the y co-ordinate.

If the maps for the various regions are indicated $W_1(x,y)$, $W_2(x,y)$ . . . in order of increasing priority, the value of the identikit image displayed in each element of the region constructed by the user is given by:

$$(.\,. \,.(((F_0(1-W_1)+W_1F_1)(1-W_2)+W_2F_2)(1-W_3)+W_3F_3)\ldots) \quad (16)$$

which corresponds to a reconstruction of the image with progressive integration of the features in order of increasing priority.

Figure 3A:
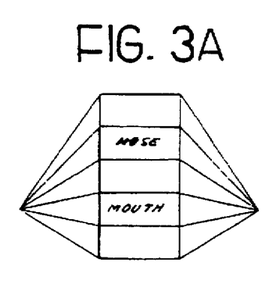
FIGS. 3A, 3B and 3C are diagrammatic illustrations of facial features with relative movement therebetween.
Figure 3B:
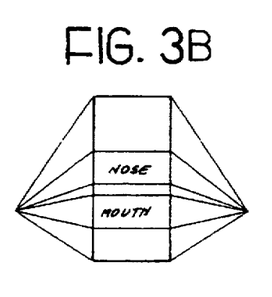
Figure 3C:
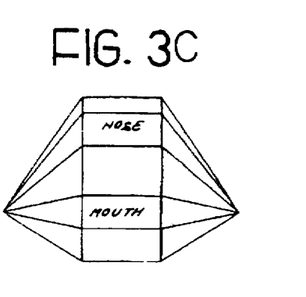
Figure 4A:
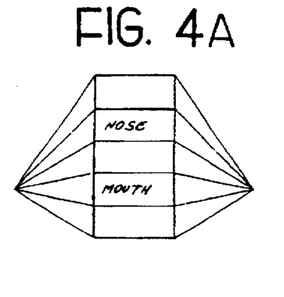
FIGS. 4A, 4B and 4C are additional diagrammatic illustrations of facial features with relative movement therebetween.
Figure 4B:
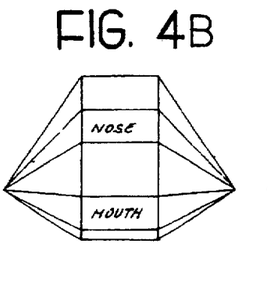
Figure 4C:
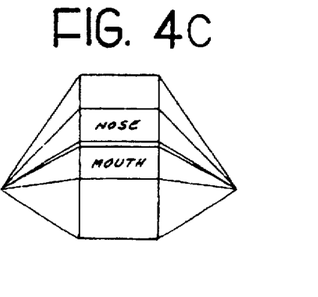

The facial features can be moved by the user by moving further cursors such as, for example, in the case of the nose and mouth, a vertical cursor indicated 5D in FIG. 2. This cursor appears beside the identikit image when these features are selected. The possible positions of the cursor are restricted by the geometry of the face. These features are moved by means of a deformation or "warping" operation. The part of the face affected is described as a set of triangles and rectangles (see FIGS. 3a) and 4a)) the co-ordinates of which are modified by the movement of the cursor. The rectangles relating to the nose and the mouth (which are moved by the cursor and are of constant size) are spaced by "cushion" rectangles with a connecting function which become wider or narrower on the basis of the movement of the nose and mouth, as shown in FIGS. 3b), 3c), 4b) and 4c).

The contents of the original polygons can be projected into those modified by the user by means of solutions known to an expert in the art. This corresponds to the association with each point of the unmodified polygons of its position inside the modified polygons by means, for example, of an affine or bilinear transformation of the co-ordinates, as described in the article "Shape transformation models" by Z. C. Li, Y. Y. Tang, T. D. Bui and C. Y. Suen, Int. Journal of Pattern Recognition and Artificial Intelligence, Volume 4(1): 65:94, 1990. This association is stored by the system and is modified only when required by the user. The storage of these corresponding co-ordinates enables the image to be reconstructed with the modified geometry (in comparison with the average face) without the need to calculate the transformation of co-ordinates repeatedly for each display of the image. Horizontal and/or vertical movements of all of the facial features can thus be achieved by the same technique.

The user can also decide to carry out a feedback operation by selecting a (sub)set of the features available (as shown at SE in FIG. 2) on the basis of which to compare the image X being formed with the data base available. The similarity of the identikit image X with each image $I_i$ in the data base can be given, for example, by:

$$d(X, I_j) = \sum_{F=1}^{Q} a_F \omega_F |\overline{C_F} - \overline{C_{Fi}}|^2 \quad (17)$$

where Q is the number of features which can be selected, $a_F=1$ if the feature has been selected by the user and, otherwise, is 0. The quantities $\omega_F$:

$$\omega_F = \left[ \sum_{i=1}^{k} \lambda_{Fi}^2 \right]^{-1} \quad (18)$$

represent a standardisation factor with which to weight the various features. Alternatively, the user can specify the importance of the features in the calculation of the disparity using cursors, in the same way as for the components of the same features.

The data base is sorted with increasing values of $d(X, I_j)$ and the first faces, for example, the first four (see the part generally indicated 5F in FIG. 2) are presented to the user. The user can indicate one of the faces with an electronic pointer and copy the features currently selected by sorting into the identikit image (the corresponding co-ordinates replace the current ones in the identikit image and the image is regenerated). Clearly, in calculating the disparity (15), geometrical data such as the positions of the nose and the mouth (selected by the user for the image X and stored in the data base for the other images) can also be inserted.

As far as searching of the data base is concerned, the system according to the invention, in its currently-preferred embodiment, offers at least two different methods of operation. The first is simply scanning of the data base (possibly sorted as in the previous point). This takes place by the selection of a set of features for sorting and the movement of a cursor which displays a set of L faces (for example, L=4) the position of which in the sorted data base corresponds to the position of a cursor 5G on its track (FIG. 2).

The second method provides for hierarchical searching of the data base and de-activates the previous method. This means that the cursor 5G shown in FIG. 2 is no longer visible, whereas specific indicators such as those indicated 5H, also in FIG. 2, appear. The user selects beforehand a set of features for the sorting of the data base. The data base is divided into L groups (clusters), for example, by means of the known technique referred to above with the use of the disparity according to equation (15). The data base is organised like a tree: the branches lead to characteristic faces $P_i$ which are gradually more similar to one another. This method can be activated at any moment by the user who can search the tree in an interactive manner using indicators such as 5H positioned near the representatives of each cluster displayed on the screen. The value of the disparity (15) with respect to the image (or identikit image) under construction is also indicated for each of the representatives. The selection of one of the representatives copies its features into the identikit image and returns the system to the normal interactive mode (the creation of an identikit image and the display of the most similar faces).

It is pointed out that the functions of a conventional identikit system which associate corresponding features with descriptions of the images (snub nose→image of snub nose) can easily be incorporated in the system described by the provision of an association table of description →components of the expansion $\vec{C}_F$ of a typical corresponding image.

Naturally, the principle of the invention remaining the same, the details of construction and forms of embodiment may be varied widely with respect to those described and illustrated, without thereby departing from the scope of the present invention.

What is claimed is:

1. A method of storing a plurality of N images of people, particularly but not exclusively in order to form photographic archives or identikit systems in which the images to be stored are distinguished by sets of features F, wherein said method comprises the steps of:

analysing said images, each of said features having a respective image $_i$ in each of said images, then associating with each feature an average region the size of which corresponds to the average size of the feature in the plurality of images, generating from said respective images a set of new images according to the expansion:

$$F_i = \sum_{j=1}^{N} C_{Fij} \Phi_j + \Phi_o$$

in which $$\Phi_o = \frac{1}{N} \sum_{i=1}^{N} F_i$$

$$C_{Fij} = (F_i - \Phi_o) \cdot \Phi_j$$

$$\Phi_j \cdot \Phi_t = \delta_{jt}, \, t=1, \ldots, N$$

$$\delta_{jt} = \begin{cases} 1 & \text{IF } j = t \\ 0 & \text{IF } j \neq t \end{cases}$$

and selecting those new images $\Phi_j$ in which $1 \leq j \leq N$ as eigenvectors of the covariance matrix in the set $\{F_i - \Phi_0\}$ so that the respective eigenvalue $\lambda_{Fj}$ can be associated with each eigenvector, the set of new images then being arranged in a manner such that $\lambda_{Fj} \geq \lambda_{Ft}$ when j>XFt when j <t, and storing said respective images in the form of vectors $$\vec{C}_{Fi} = \{C_{Fi1}, \ldots, C_{Fik}\}, k<N$$

where k is a number usually much less than N so that a set of vectors, one for each of the regions of the face used in the method, is associated with each of the images of the plurality.

2. A method according to claim 1, wherein each image is reconstructed according to the equation $$F = \sum_{j=1}^{k} C_{Fj} \Phi_j + \Phi_o$$

in order to reconstruct each of the images from the respective set of vectors.

3. A method according to claim 2, wherein said vectors have co-ordinates the values of the which are selected by moving cursors to positions with which values for the corresponding co-ordinates are associated.

4. A method according to claim 2, wherein said images are reconstructed by operating on a region with larger dimensions than the average region, the calculation of said covariance matrix and of the values of said expansion being limited to the average region, the region outside the average region, and inside the enlarged used for connecting the various features.

5. A method according to claim 1, wherein said method further comprises the step of identifying images having a disparity of less than a predetermined threshold disparity to reduce said plurality of images.

6. A method according to claim 5, wherein said disparity is calculated by an equation of the type $$d^2(X, Y) = \sum_{h=1}^{T} (X_h - Y_h)^2$$

where T represents the number of pixels of the image considered as a vector, X and Y being the two images between which the disparity is calculated.

7. A method according to claim 5, wherein said disparity is calculated according to the equation $$d^2p = 1 - P_{xy}$$

in which $P_{xy}$ represents the standardized correlation coefficient $$P_{xy} = \frac{\mu_{xy}}{\sqrt{\mu_{xx}\mu_{yy}}}$$

in which $$\mu_{xy} = \frac{1}{T} \sum_{h=1}^{T} \left( X_h - \frac{1}{T} \sum_{j=1}^{T} X_j \right) \left( Y_h - \frac{1}{T} \sum_{j=1}^{T} Y_j \right)$$

$$\mu_{xx} = \frac{1}{T} \sum_{h=1}^{T} \left( X_h - \frac{1}{T} \sum_{j=1}^{T} X_j \right)^2$$

$$\mu_{yy} = \frac{1}{T} \sum_{h=1}^{T} \left( Y_h - \frac{1}{T} \sum_{j=1}^{T} Y_j \right)^2$$

$\mu_{xy}$ represents a second-order centered moment of the variables X and Y representative of the images between which the disparity is calculated and T represents the number of pixels of the image considered as a vector.

8. A method according to claim 1, wherein said plurality of images is divided into subsets of images having substantially similar features, the method being applied to these subsets separately.

9. A method according to claim 1, wherein said plurality of images is subjected to geometric standardization so that the images of said plurality are of uniform size and orientation, before the analysis is begun.

10. A method according to claim 9, wherein said geometric standardization operation comprises the step of identifying the position of each pupil of each of said images and the operation of bringing said position to a predetermined reference position.

11. A method according to claim 1, wherein the images (F) of said plurality are subjected to a standardization of their intensity values before the analysis is begun.

12. A method according to claim 11, wherein said standardization of the intensity values is carried out by causing the average intensity value of a specific region of the image to assume a predetermined value.

13. A method according to claim 1, wherein each image F of said plurality are subjected to a transformation of the type $$M = \begin{cases} M' & \text{if } M' \leq 1 \\ 2 - \frac{1}{M'} & \text{if } M' > 1 \end{cases}$$

where $$M' = \frac{F}{F * K_{G(\sigma)}}$$

and F is the original image and the symbol * represents the convolution operation, $K_{G\sigma}$ represents a Gaussan convolution kernel, the parameter a (standard deviation) of which is correlated with the interocular distance of said image before the analysis is begun.

14. A method according to claim 2, wherein, in the reconstruction step, the images are reconstructed as the sum of the features available and of an average image corresponding to an arithmetic mean of the images stored.

15. A method according to claim 1, wherein said method further comprises the step of associating, with each of the features, a respective priority and a respective map of values the size of which corresponds to that of the overall image, in which are identified:

a region outside the respective feature, an inner region of the respective feature, corresponding to the average region used for calculating the covariance matrix and the expansion values, and a transition region, and the step of setting the map values to 1 in the inner region, to 0 in the outer region and to an intermediate value in the transition region, thus achieving a blending of the features.

16. A method according to claim 15, wherein the transitional region is one-dimensional and said intermediate value is selected by a law of the type:

$$W_f(x) = \begin{cases} 0 & X < X_0 \\ 0 & X > X_3 \\ 1 & X \in [X_1, X_2] \\ \frac{1}{2}\left[1 - \cos\left(\pi \frac{X - X_0}{X_1 X_0}\right)\right] & X \in [X_0, X_1] \\ \frac{1}{2}\left[1 - \cos\left(\pi \frac{X - X_3}{X_2 - X_3}\right)\right] & X \in [X_2, X_3] \end{cases}$$

$$W_f(x) = \begin{cases} 0 & x < x_0 \\ 0 & x > x_3 \\ 1 & x \in [x_1, x_2] \\ \frac{1}{2}\left[1 - \cos\left(\pi \frac{x - x_0}{x_1 x_0}\right)\right] & x \in [x_0, x_1] \\ \frac{1}{2}\left[1 - \cos\left(\pi \frac{x - x_3}{x_2 - x_3}\right)\right] & x \in [x_2, x_3] \end{cases}$$

where x is the one-dimensional coordinate with the one-dimensional region being defined as $r_F = [X_1, X_2]$ $R_F = [X_0, X_3]$ where $r_F$ is the inner region, $(R_F - r_F)$ is the transition region, where $X_0 <_1 < X_2 < X_3$.

17. A method according to claim 15, wherein the transitional region is two-dimensional and the intermediate value is the product of the functions $W_F$ of the x-co-ordinate and y-co-ordinate, respectively, the reconstruction value being given by $$( \ldots (((F_0(1-W_1)+W_1F_1)\,(1-W_2)+W_2F_2)\,(1-W_3)+W_3F_3) \ldots ).$$

18. A method according to claim 1, wherein said method further comprises the step of comparing the images stored with an additional image in the course of formation, generating a respective similarity parameter, then sorting the set of images stored in order of increasing disparity or dissimilarity values with respect to the image in the course of construction, and the step of displaying a certain number of stored images having a certain degree of similarity to the images in the course of construction.

19. A method according to claim 18, wherein said disparity or dissimilarity is defined according to an equation of the type $$D(X, I_i) = \sum_{F=1}^{Q} a_F \omega_F |\vec{C}_F - \vec{C}_{Fi}|^2$$

where Q is the number of features which can be selected; $a_F = 1$ or 0 according to whether the feature has been selected or not, the quantity $$\omega_F = \left[ \sum_{i=1}^{K} \lambda_{Fi}^2 \right]^{-1}$$

and represents a standardization factor with which to weight the various features, and the vectors $\vec{C}_F$, $\vec{C}_{Fi}$ the image being constructed and the image i of the data base, respectively, within the limits of the feature F.

20. A method according to claim 19, wherein pointing to (selecting) one of the images displayed replaces the descriptive components of the feature selected in the image being constructed with those of the image selected.

21. A method according to claim 19, wherein said set of images in the data base is organized and presented in a hierarchical manner, and wherein pointing to (selecting) one of the images displayed replaces the descriptive components of the features selected in the image being constructed with those of the image selected.

22. A system for storing a plurality of N images of people, particularly but not exclusively in order to form photographic archives or identikit systems, in which the images to be stored are distinguished by sets of features F, characterized in that it comprises:

acquisition and analysis means for analyzing the images, each of the features having a respective image $F_i$ in each of the images, and then for associating with each feature an average region, the size of which corresponds to the average size of the feature in the plurality of images, processor means for generating, from the respective images, a set of new images such that $$F_i = \sum_{j=1}^{N} C_{Fij}\Phi_j + \Phi_o$$

where $$\Phi_o = \frac{1}{N} \sum_{i=1}^{N} F_i$$

$$C_{Fij} = (F_i - \Phi_0)\Phi_j$$

$$\Phi_j \cdot \Phi_t = \delta_{jt},\ t=1,\ldots,N$$

$$\delta_{jt} = \begin{cases} 1 & \text{IF } j = t \\ 0 & \text{IF } j \neq t \end{cases}$$

the new images $\Phi_j$ in which $1 < j < N$ being selected as eigenvectors of the covariance matrix in the set $\{F_i - \Phi_0\}$ so that a respective eigenvalue $\lambda_{Fj}$ can be associated with each eigenvector, the processing means then sorting the set of new images in a manner such that $\lambda_{Fj} \geq \lambda_{Ft}$ when $j < t$ and storing the respective images in the form of vectors $$\overline{C}_{Fi} = \{C_{Fi1}, \ldots, C_{Fik}\}$$

so that a set of vectors, one for each of the regions of the face used in the system, is associated with each image of the plurality.

23. A system according to claim 22, wherein it comprises restoring means for reconstructing each of the images from the respective set of vectors, the restoring means reconstructing each image according to the equation $$F_i = \sum_{j=1}^{N} C_{Fij}\Phi_j + \Phi_o \qquad k < N$$

where K is a number much less than N.

24. A system according to claim 23, wherein it comprises cursor means for selecting the co-ordinates of the vectors, the position of the cursor means being associated with a value for the corresponding co-ordinate.

25. A system according to claim 23, wherein said restoring means operate on a region with larger dimensions than the average region, the calculation of the covariance matrix and of the values of said equation being limited to the average region, the region outside the average region and inside the enlarged region being used for connecting the various features.

26. A system according to claim 22, wherein said processing means reduce the plurality of images by identifying amongst them the images the disparity of which is less than a predetermined threshold disparity.

27. A system according to claim 26, wherein said processing means calculate the disparity with an equation of the type $$d^2(X, Y) = \sum_{h=1}^{T} (X_h - Y_h)^2$$

where T represents the number of pixels of the image considered as a vector, X and Y being the two images between which the disparity is calculated.

28. A system according to claim 26, wherein said processing means calculate the disparity according to the equation $$d^p = 1 - P_{xy}$$

where $P_{xy}$ represents the standardized correlation coefficient $$P_{xy} = \frac{\mu_{xy}}{\sqrt{\mu_{xx}\mu_{yy}}}$$

in which $$\mu_{xy} = \frac{1}{T} \sum_{h=1}^{T} \left( X_h - \frac{1}{T} \sum_{j=1}^{T} X_j \right) \left( Y_h - \frac{1}{T} \sum_{j=1}^{T} Y_j \right);$$

$$\mu_{xx} = \frac{1}{T} \sum_{h=1}^{T} \left( X_h - \frac{1}{T} \sum_{j=1}^{T} X_j \right)^2;$$

$$\mu_{yy} = \frac{1}{T} \sum_{h=1}^{T} \left( Y_h - \frac{1}{T} \sum_{j=1}^{T} Y_j \right)^2$$

μxyrepresents a second order centered movement of the variables X and Y representative of the images between which the disparity is calculated and T represents the number of pixels of the image considered as a vector.

29. A system according to claim 22, wherein said processing means divide the plurality of images into subsets of images having substantially similar features.

30. A system according to claim 22, wherein it comprises pre-processing means which act between the acquisition and analysis means and the processing means, and in which the plurality of images is subjected to geometric standardization so that the images of the plurality are of uniform size and orientation.

31. A system according to claim 30, wherein said pre-processing means identify the position of each pupil of each of said images, the pre-processing means bringing this position to a predetermined reference position.

32. A system according to claim 22, wherein it comprises pre-processing means which act between the acquisition and analysis means and the processing means, and in which the images of the plurality are subjected to a standardization of their intensity values.

33. A system according to claim 32, wherein the preprocessing means cause the average intensity value of a specific region of the image to assume a predetermined value during the standardization of the intensity values.

34. A system according to claim 22, wherein it comprises pre-processing means which act between the acquisition and analysis means and the processing means, and in which each image F of the plurality is subjected to a transformation of the type $$M = \begin{cases} M' & \text{if } M' \leq 1 \\ 2 - \frac{1}{M'} & \text{if } M' > 1 \end{cases}$$

where $$M' = \frac{F}{F * K_{G(\sigma)}}$$

F is the original image and the symbol * represents the convolution operation, $K_{G(\delta)}$ represents a Gaussian convolution kernel the parameter δ (standard deviation) of which is correlated to the interocular distance.

35. A system according to claim 23, wherein said restoring means reconstruct the images as the sum of the features available and of an average image corresponding to an arithmetic mean of the images stored.

36. A system according to claim 22, wherein said processing means associate with each of the features a respective priority and a respective map of values the size of which corresponds to that of the overall image, in which are identified:

a region outside the respective feature, an inner region of the respective feature corresponding to the average region used for calculating the covariance matrix and the expansion values, and a transition region, and wherein the processing means set the map values to 1 in the inner region, to 0 in the outer region and to an intermediate value in the transition region so that the restoring means achieve a blending of the features.

37. A system according to claim 36, wherein the transitional region is one-dimensional and said intermediate value is selected by a law of the type:

$$W_f(x) = \begin{cases} 0 & x < x_0 \\ 0 & x > x_3 \\ 1 & x \in [x_1, x_2] \\ \frac{1}{2}\left[1 - \cos\left(\pi \frac{x - x_0}{x_1 - x_0}\right)\right] & x \in [x_0, x_1] \\ \frac{1}{2}\left[1 - \cos\left(\pi \frac{x - x_3}{x_2 - x_3}\right)\right] & x \in [x_2, x_3] \end{cases}$$

where x is the one-dimensional coordinate the one-dimensional region being defined as $r_F = [X_1, X_2]$ $R_F[X_0, X_3]$ where $X_0 < X_1 < X_2, X_3$ and $r_F$ is the inner region, $(R_F - r_F)$ is the transition region.

38. A system according to claim 36, wherein the transitional region is two-dimensional, the processing means process the intermediate value using the product of the functions $W_F$ of the x-co-ordinate and the y-coordinate, respectively, the restored value being given by $( \ldots (((F_0(1-W_1)+W_1F_1)(1-W_2)+W_2F_2)(1-FW_3)+W_3F_3) \ldots )$.

39. A system according to claim 23, wherein said processing means compare the images stored with an additional image in the course of formation to generate a respective similarity parameter, and then sort the set of images stored in order of increasing values of disparity or dissimilarity with respect to the images in the course of construction, the system also comprising restoring means for displaying a certain number of stored images having a certain degree of similarity to the images in the course of construction.

40. A system according to claim 39, wherein said disparity or dissimilarity is defined according to an equation of the type $$D(X, I_i) = \sum_{F=1}^{Q} a_F \omega_F |\vec{C_F} - \vec{C_{Fi}}|^2$$

where Q is the number of features which can be selected, $a_F = 1$ or 0 according to whether the feature has been selected or not, the quantity $$\omega_F = \left[ \sum_{i=1}^{K} \lambda_{F_i}^2 \right]^{-1}$$

and represents a standardization factor with which to weight the various features/ and the vectors $\vec{C}_F$, $\vec{C}_{F_i}$ represent the image being constructed and the image i of the data base, respectively, within the limits of the feature F.

41. A system according to claim 40, wherein said system comprises means for pointing to (selecting) one of the images displayed and means for replacing the descriptive components of the features selected in the image being formed with those of the image selected.

42. A system according to claim 40, wherein said set of images of the data base is organized and presented in a hierarchical manner, and wherein pointing to (selecting) one of the images displayed replaces the descriptive components of the features selected in the image being constructed with those of the image selected.

* * * * *